(12) United States Patent
Morein et al.

(10) Patent No.: US 10,503,955 B2
(45) Date of Patent: Dec. 10, 2019

(54) DEVICE WITH IMPROVED CIRCUIT POSITIONING

(71) Applicant: Synaptics Incorporated, San Jose, CA (US)

(72) Inventors: Stephen Morein, San Jose, CA (US); Guozhong Shen, San Jose, CA (US); Jason Goodelle, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 57 days.

(21) Appl. No.: 15/995,717

(22) Filed: Jun. 1, 2018

(65) Prior Publication Data

US 2019/0065814 A1    Feb. 28, 2019

Related U.S. Application Data

(60) Provisional application No. 62/551,541, filed on Aug. 29, 2017.

(51) Int. Cl.
G06K 9/00 (2006.01)
G06F 3/041 (2006.01)
G06F 3/044 (2006.01)
G06F 3/042 (2006.01)

(52) U.S. Cl.
CPC ........ *G06K 9/0004* (2013.01); *G06F 3/0412* (2013.01); *G06K 9/0002* (2013.01); *G06F 3/042* (2013.01); *G06F 3/044* (2013.01)

(58) Field of Classification Search
CPC ... G06K 9/0004; G06K 9/0002; G06F 3/0412
See application file for complete search history.

(56) References Cited

U.S. PATENT DOCUMENTS

| | | | | |
|---|---|---|---|---|
| 9,195,879 B1* | 11/2015 | Du | ...................... | G06K 9/00067 |
| 2012/0081412 A1* | 4/2012 | Kim | ...................... | G06F 3/0421 |
| | | | | 345/690 |
| 2013/0076687 A1* | 3/2013 | Giddings | .............. | G06F 3/0412 |
| | | | | 345/174 |
| 2014/0359757 A1* | 12/2014 | Sezan | ..................... | G06F 21/32 |
| | | | | 726/19 |
| 2015/0268797 A1* | 9/2015 | Kurasawa | ............. | G06F 3/0418 |
| | | | | 345/174 |

(Continued)

OTHER PUBLICATIONS

H. Tang et al., "11.2 3D ultrasonic fingerprint sensor-on-a-chip," 2016 IEEE International Solid-State Circuits Conference (ISSCC), San Francisco, CA, 2016, pp. 202-203. (Year: 2016).*

*Primary Examiner* — Utpal D Shah
(74) *Attorney, Agent, or Firm* — Leydig, Voit & Mayer, Ltd.

(57) ABSTRACT

Disclosed is a sensor device comprising: a two-dimensional array of sensor pixel circuits, wherein the two-dimensional array includes a first axis and second axis, and wherein the two-dimensional array includes more sensor pixel circuits along the second axis than along the first axis; a gate drive circuit disposed along on the first axis of the two-dimensional array configured to drive one or more sensor pixel circuits; and, a readout circuit disposed along on the first axis of the two-dimensional array configured to receive output information from the one or more sensor pixel circuits.

20 Claims, 10 Drawing Sheets

(56) References Cited

U.S. PATENT DOCUMENTS

| | | | |
|---|---|---|---|
| 2016/0026330 A1* | 1/2016 | Shepelev | G06F 3/044 345/174 |
| 2016/0063300 A1* | 3/2016 | Du | G06K 9/00033 382/124 |
| 2017/0090028 A1* | 3/2017 | Djordjev | G01S 15/89 |
| 2017/0270337 A1* | 9/2017 | Zhu | G01J 1/44 |
| 2018/0218191 A1* | 8/2018 | Berget | G06F 3/0416 |

* cited by examiner

DEVICE WITH IMPROVED CIRCUIT POSITIONING

CROSS-REFERENCE TO RELATED APPLICATIONS

The present patent application claims priority to U.S. Provisional Patent Application Ser. No. 62/551,541, filed on Aug. 29, 2017, which is hereby incorporated by reference in its entirety.

BACKGROUND

Input devices, including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

One embodiment provides a sensor device comprising: a two-dimensional array of sensor pixel circuits, wherein the two-dimensional array includes a first axis and second axis, and wherein the two-dimensional array includes more sensor pixel circuits along the second axis than along the first axis; a gate drive circuit disposed along on the first axis of the two-dimensional array configured to drive one or more sensor pixel circuits; and, a readout circuit disposed along on the first axis of the two-dimensional array configured to receive output information from the one or more sensor pixel circuits.

Another embodiment provides a sensor system, comprising an input surface providing a sensing region for sensing a fingerprint of a finger. The sensor devices comprises: a two-dimensional array of sensor pixel circuits for sensing the fingerprint, wherein the two-dimensional array includes a first axis and second axis, and wherein the two-dimensional array includes more sensor pixel circuits along the second axis than along the first axis; a gate drive circuit disposed along on the first axis of the two-dimensional array configured to drive one or more sensor pixel circuits; and, a readout circuit disposed along on the first axis of the two-dimensional array configured to receive output information from the one or more sensor pixel circuits.

Another embodiment provides a sensor device comprising: a two-dimensional array of sensor pixel circuits, wherein the two-dimensional array includes a first axis and second axis, and wherein the two-dimensional array includes more sensor pixel circuits along the second axis than along the first axis; means for driving one or more sensor pixel circuits, wherein the means for driving the one or more sensor pixel circuits is disposed along on the first axis of the two-dimensional array; and, means for receiving output information from the one or more sensor pixel circuits, wherein the means for receiving the output information from the one or more sensor pixel circuits is disposed along on the first axis of the two-dimensional array.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary, and brief description of the drawings, or the following detailed description.

Some embodiments provide a sensor device with improved gate drive circuit positioning. In some systems, a two-dimensional sensor array is disposed in an electronic device such that a gate drive circuit is disposed along on one axis (e.g., an x-axis) and a readout circuit is disposed along the other axis (e.g., a y-axis) of the two-dimensional sensor array. In some implementations, the y-axis is shorter than the x-axis, for example, when the two-dimensional sensor array is a rectangular fingerprint sensor array that is disposed in the limited space between a bottom edge of a display screen and a bottom edge of mobile device.

Embodiments provide a sensor device where the gate drive circuit and the readout circuit are both disposed on the same axis (e.g., along the y-axis) of a two-dimensional sensor array. In this manner, the dimensions of the overall sensor device can be reduced in the y-dimension.

Figure 1:
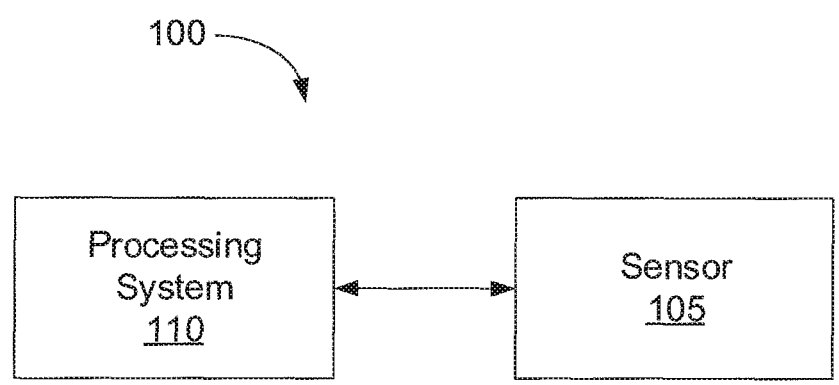
FIG. 1 is a block diagram of an example input device.

FIG. 1 is a block diagram of an example input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, radio frequency (RF), and IRDA.

In FIG. 1, a sensor 105 is included with the input device 100. The sensor 105 comprises one or more sensing elements configured to sense input provided by one or more input objects in a sensing region. Examples of input objects include fingers, styli, and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, and other suitable photosensors sensitive to light in wavelength(s) of interest. In one implementation, active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the electronic device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for an optical sensor device may comprise driver circuitry configured to drive illumination signals to one or more LEDs or other light sources, and/or receiver circuitry configured to receive signals with optical receiving elements.

The processing system 110 may include electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
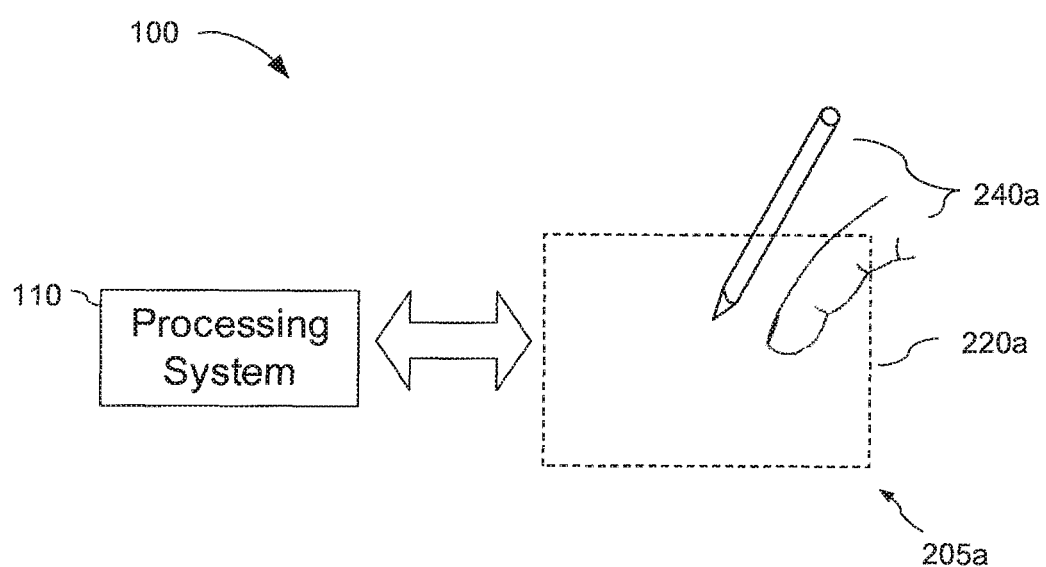
FIG. 2A is a block diagram of another example input device.
Figure 2B:
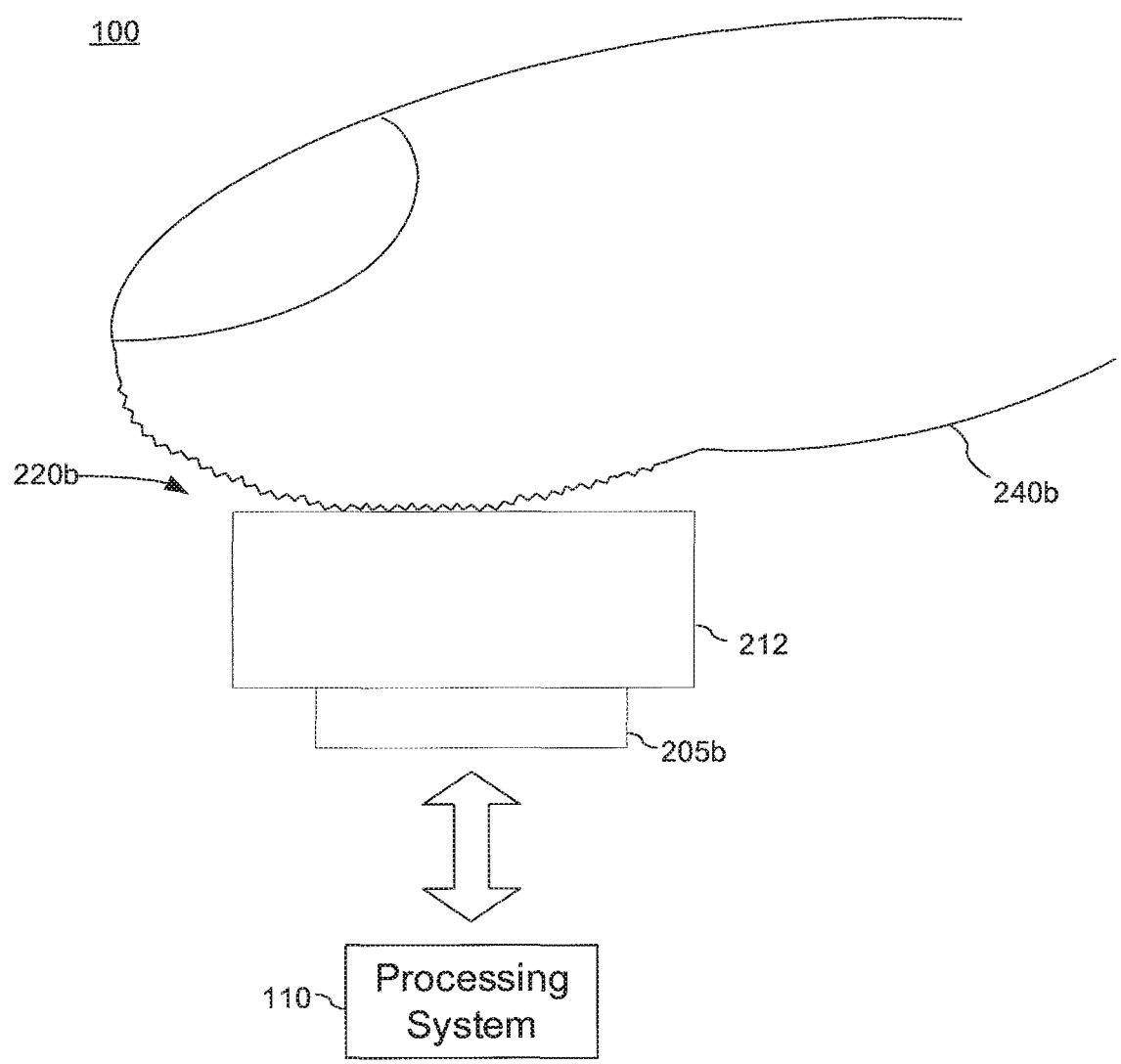
FIG. 2B is a block diagram of another example input device.

FIGS. 2A-2B depict further example input devices 100. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The sensor 205b is disposed underneath a cover layer 212 that provides an input surface for the fingerprint to be placed on or swiped over the sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3A:
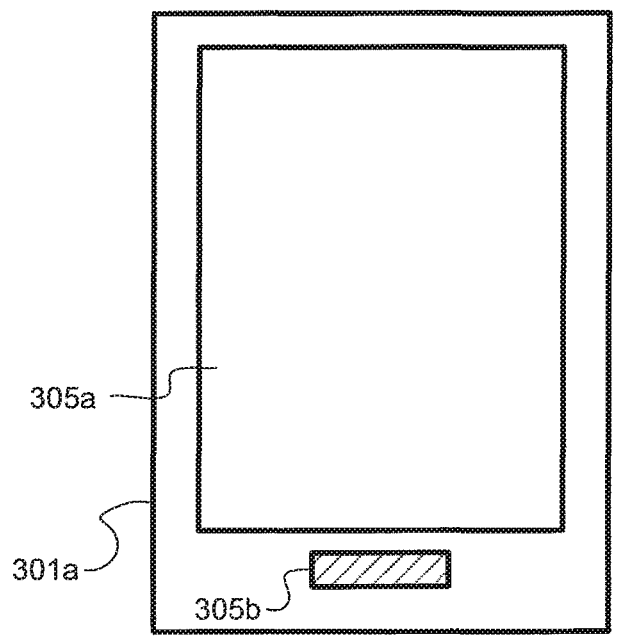
FIGS. 3A-3B are block diagrams illustrating example electronic devices having both a touch screen interface and a fingerprint sensing interface.
Figure 3B:
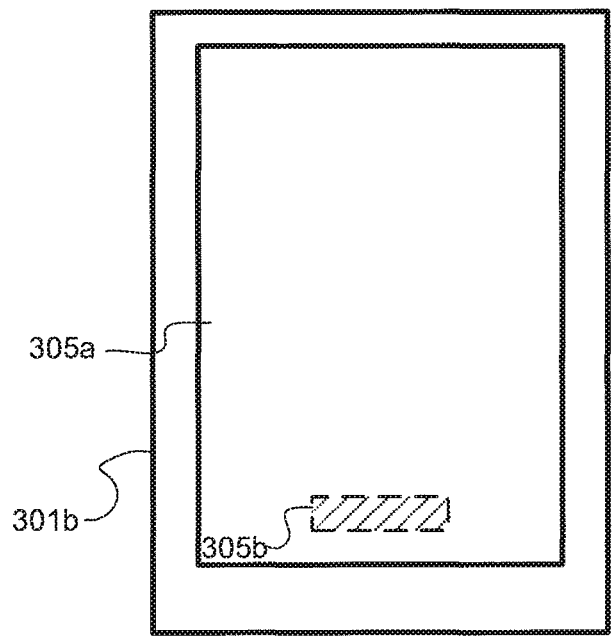

FIGS. 3A-3B are block diagrams illustrating example electronic devices 301a and 301b having both a display and a fingerprint sensing interface. In FIG. 3A, the electronic device (e.g., a mobile device, such as a smartphone or tablet) 301a has a fingerprint sensor 305b that is separate from the active display area 305a. In FIG. 3B, the electronic device 301b has a fingerprint sensor 305b that is integrated within the active display area 305a, such that the interface for the fingerprint sensor overlaps with the interface for the touch sensor. In FIGS. 3A-3B, a touch sensor interface may also overlap with the active area of the display, such that in FIG. 3B the active display area includes both a fingerprint sensing and touch sensing interface.

Figure 4:
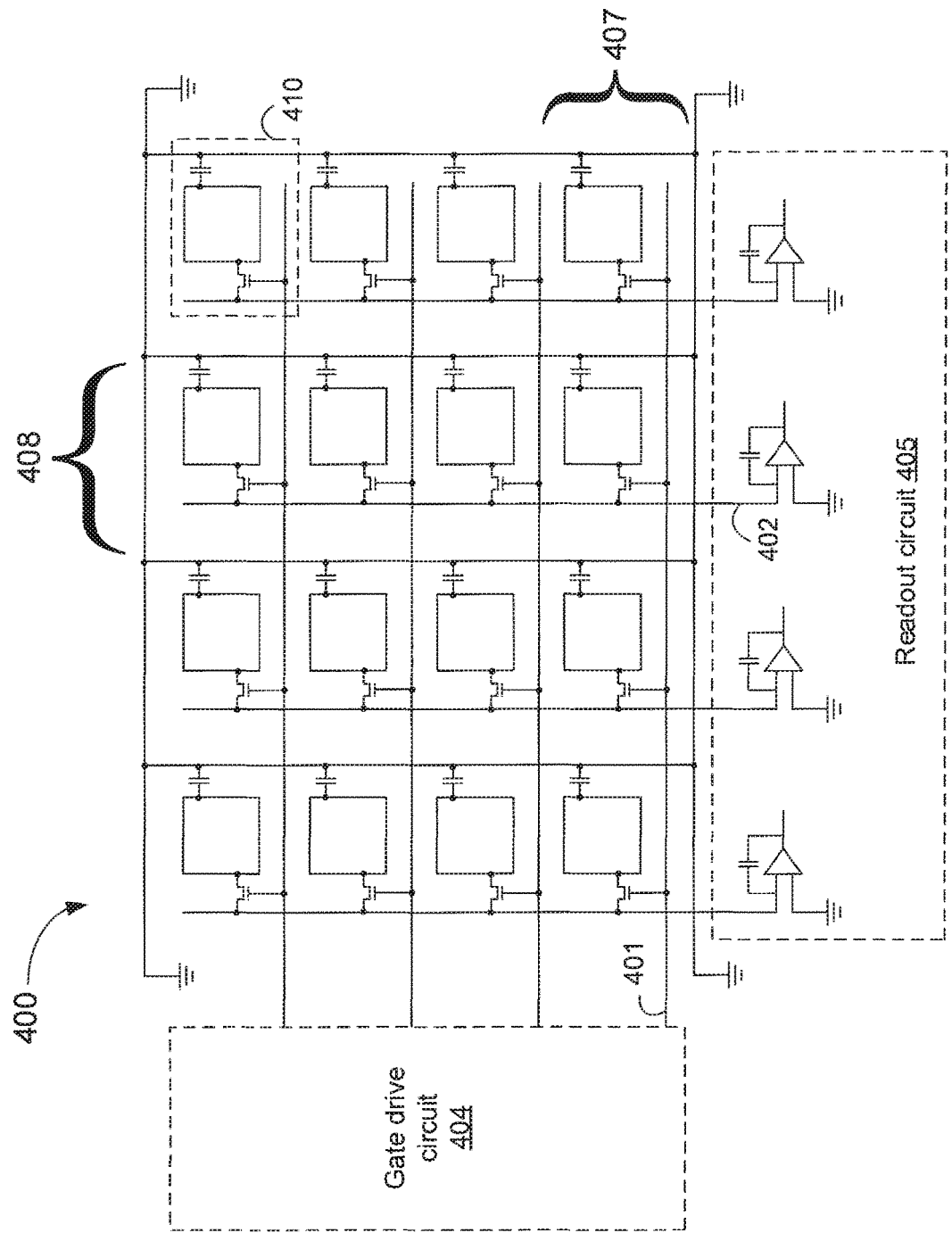
FIG. 4 illustrates one embodiment of a sensor device, according to one embodiment.

FIG. 4 illustrates one embodiment of a sensor device 400, according to one embodiment. The sensor device 400 includes an array of sensing elements, referred to as pixels 410 or pixel cell circuits or active pixel sensors (APS). Sensor device 400 has an array of sensing elements arranged in a row and column format. In one embodiment, each sensing element includes a detector, a capacitor, and a readout device (e.g., a transistor). In various embodiments, the detector comprises a photodiode or a capacitive detector.

The size of each sensing element and/or spacing between sensing elements may be based on a desired resolution for the sensor device 400. As an example, the resolution may be high enough to discern between ridges and valleys of a fingerprint of a finger. In one implementation, each sensing element may have a pitch of approximately 10 microns by 10 microns. Alternatively, smaller or larger pitch dimensions may be used.

The array of sensing elements may be addressed by sets of row conductor lines 401 and column conductor lines 402. In one embodiment, each transistor in a column (e.g., column 408) may be coupled to a common data readout line (e.g., line 402) and each transistor in a row (e.g., row 407) may be coupled to a common row conductor line (e.g., line 401). The row conductor lines are coupled to gate drive circuitry 404. Each sensing element may be addressed, or selected, through an associated row conductor line (e.g., line 401) and a column conducting line (e.g., line 402) using gate drive circuitry 400 and readout circuitry 405.

Figure 5:
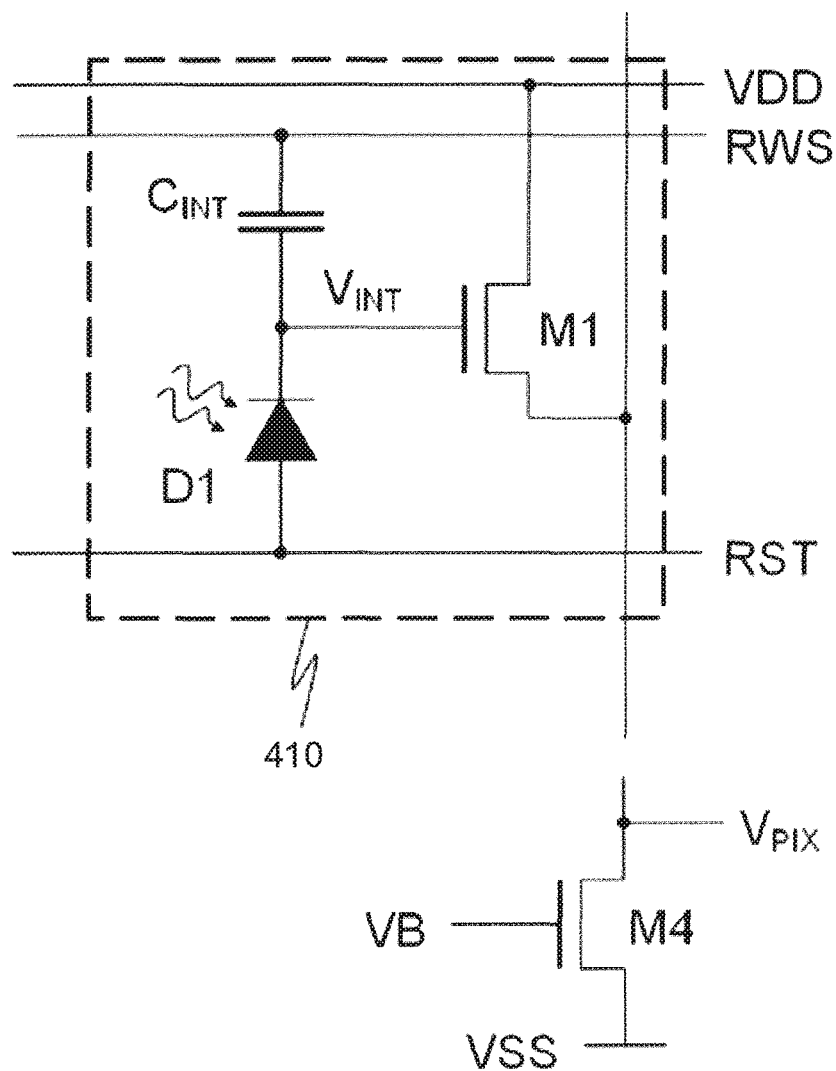
FIG. 5 is an example of an active circuit of a sensor pixel of a sensor array, according to one embodiment.

FIG. 5 is an example of an active circuit of a sensor pixel 410 of a sensor array, according to one embodiment. As described, a sensor array includes many pixels arranged in columns and rows. One sensor pixel 410 is shown in FIG. 5 as an example.

In one implementation, the sensor pixel 410 is a one-transistor (i.e., "1T") pixel. The sensor pixel includes: a single transistor M1, a photodiode D1, and an integration capacitor $C_{INT}$. In some implementations, the transistor M1 may be a thin-film transistor (TFT) and the photodiode may be a thin-film lateral PIN photodiode.

The operation of the 1T pixel circuit is briefly described herein. During a first reset period, a reset signal (RST) is pulsed high and the integration capacitor $C_{INT}$ is reset to its initial value via the forward biased photodiode D1. When the RST is brought low, the integration period begins as the photocurrent of the now reverse biased photodiode D1 begins to be integrated on the integration capacitor $C_{INT}$. The pixel sample period is initiated at the end of the integration period when the row select signal (RWS) is pulsed high. Here, charge injection occurs across the integration capacitor $C_{INT}$ and the voltage of the integrating node ($V_{INT}$) is raised above the threshold voltage of the source follower transistor M1 and a pixel source follower amplifier (formed by transistor M1 and the column bias transistor M4) is turned on. The output voltage of this pixel source follower amplifier ($V_{PIX}$) is now sampled and held within the column sample circuits to be subsequently readout sequentially by column by readout circuitry.

At the end of the pixel sample period, signal RWS is returned to its low potential, charge is removed from the pixel integrating node and its potential drops back below the threshold voltage of the source follower transistor M1 turning it off. The advantages of this 1T active pixel sensor (APS) include an increased aperture ratio and reduced pixel sample time compared to a three-transistor (i.e., "3T") APS. However, due to its dual purpose, the size of the integration capacitor becomes a trade-off between sensitivity to incident illumination and pixel output voltage range, i.e., a small capacitor gives a large voltage drop on the integration node during the integration period but reduces the voltage rise in the sample period. More transistors are commonly used in one APS pixel to reduce the noise. For example, four-transistor (i.e., "4T"), five-transistor (i.e., "5T") pixels, or six-transistor (i.e., "6T") pixels can be implemented.

Figure 6:
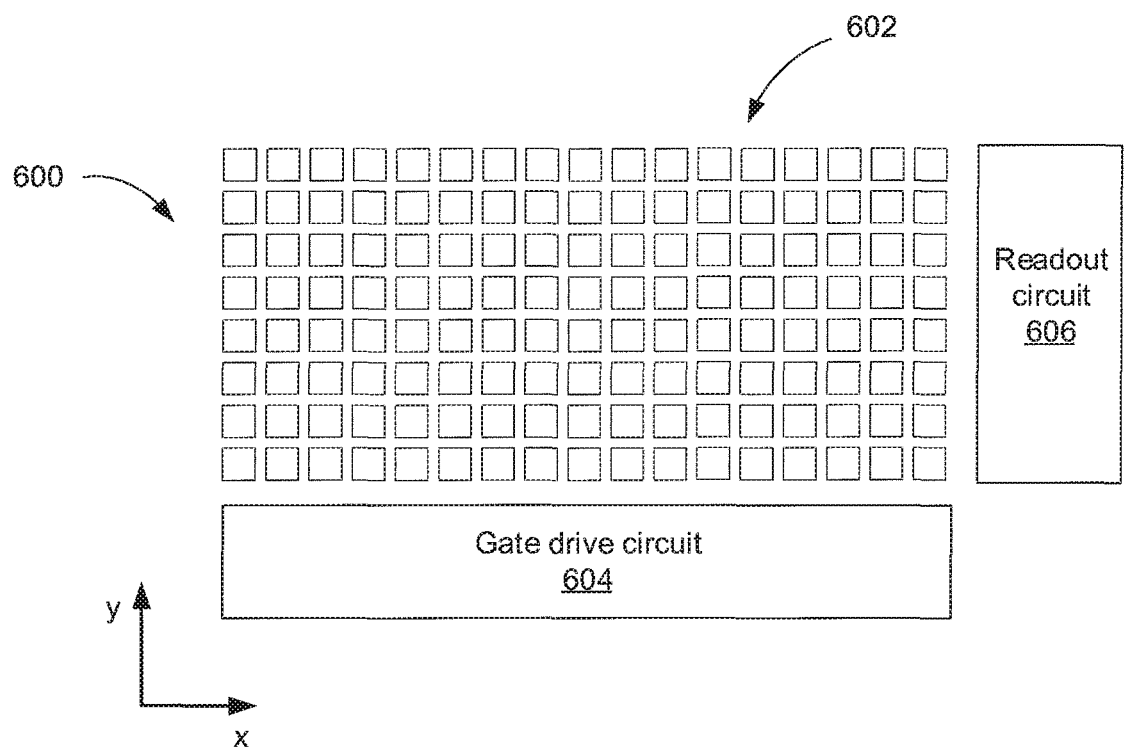
FIG. 6 is an example of a sensor device.

FIG. 6 is an example of a sensor device 600. The sensor device 600 includes a pixel array 602. A gate drive circuit 604 is configured to drive a signal to a gate of a transistor included at each pixel location in the pixel array 602. For example, the drive signal may be received by the gates of the transistors included in one column of the pixel array 602. A readout circuit 606 is included in the sensor device 600, and is configured to receive output information from the pixel locations in the pixel array 602. The row lines and column lines are omitted for clarity in FIG. 6.

As shown in FIG. 6, the gate drive circuit 604 is disposed along the x-axis of the pixel array 602, and the readout circuit 606 is disposed along the y-axis of the pixel array 602. In FIG. 6, the gate drive circuit 604 is disposed along a different axis than the readout circuit 606. However, this causes a problem that the dimensions of the sensor device 600 are increased in the y-dimension, since the y-dimension includes the length of the pixel array 602 in the y-dimension and the length of the gate drive circuit 604 in the y-dimension.

Some embodiments provide for a sensor device where the gate drive circuit and the readout circuit are both disposed along the same axis of a two-dimensional sensor array, for example both disposed along the y-axis. In this manner, the dimensions of the overall sensor device can be reduced in the y-dimension.

Figure 7:
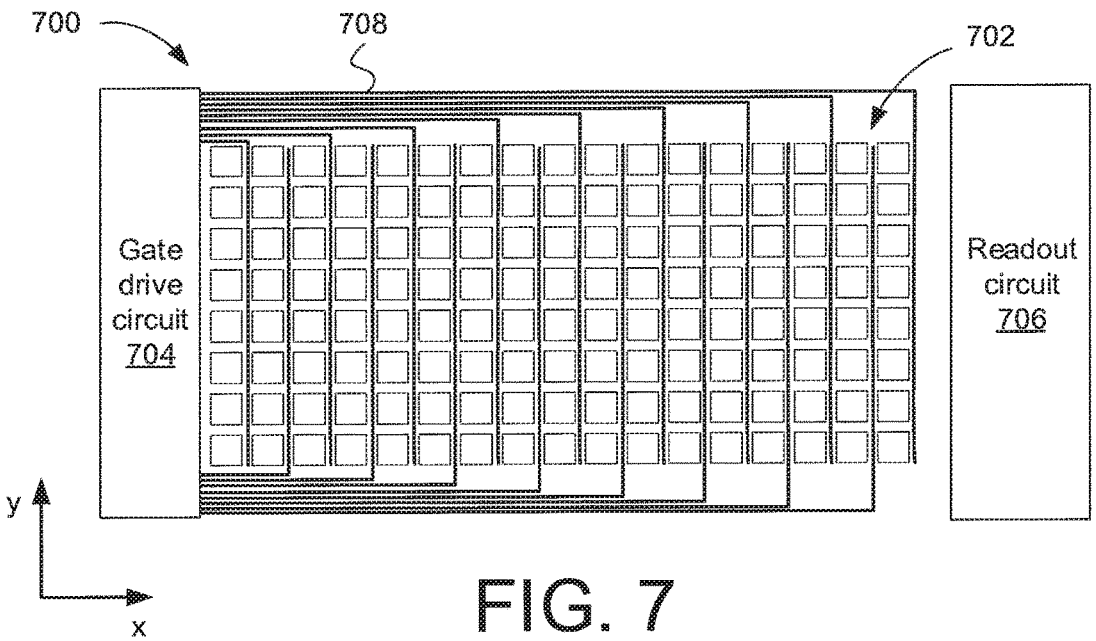
FIGS. 7-11 are examples of a sensor devices, according to various embodiments.

FIG. 7 is an example of a sensor device 700, according to one embodiment. As shown, the sensor device 700 includes a pixel array 702. A gate drive circuit 704 is configured to drive a signal to a gate of a transistor included at each pixel location in the pixel array 702. A readout circuit 706 is included in the sensor device, and is configured to receive output information from the pixel locations in the pixel array 702. As described, the readout circuit 706 is connected to the source or drain of a transistor included at each pixel location in the pixel array 702, depending on the particular configuration.

In one implementation, the sensor array 702, the gate drive circuit 704, the readout circuit 706, and traces 708 are formed on common thin-film transistor (TFT) layer. The TFT layer can be disposed on a glass or plastic substrate. In some embodiments, the readout circuit 706 may be disposed on a separate substrate than a substrate on which the sensor array 702 is disposed, where the readout circuit 706 is connected to the sensor array 702 via a flexible connector. In such an implementation, the readout circuit 706 shown along the y-axis in FIG. 7 corresponds to an attach region of the flexible connector, and the readout circuit itself can be elsewhere.

The pixel array 702 can be a two-dimensional array. For reference, the pixel array 702 may have an x-axis (i.e., left-to-right in the image shown in FIG. 7) and a y-axis (i.e., up-and-down in the image shown in FIG. 7). In the example shown, the pixel array 702 has a rectangular shape, where each row of pixels in the sensor array includes a first number of pixels and each column of pixels in the sensor array includes a second number of pixels. The first number and the second number can be the same (i.e., a squared-shaped sensor) or different (i.e., a rectangular-shaped sensor). In the example in FIG. 7, the first number of pixels is greater than the second number of pixels.

In the embodiment shown in FIG. 7, the gate drive circuit 704 and the readout circuit 706 are disposed along the same axis relative to the pixel array 702, i.e., both are disposed along the y-axis. In the embodiment shown in FIG. 7, the gate drive circuit 704 is disposed on one side (i.e., left side) of the pixel array 702, whereas the readout circuit 706 is disposed on the other side (i.e., right side) of the pixel array 702.

As shown in FIG. 7, the traces 708 from the gate drive circuit 704 to the individual pixels in the pixel array are routed along the outside of the pixel array 702. In the embodiment shown, alternating columns of pixels are reached by traces that alternate from originating at a bottom side of the pixel array 702 to originating at a top side of the pixel array 702. In other embodiments, two or more consecutive columns of pixels are reached by traces that originate at a bottom side of the pixel array 702 or that originate at a top side of the pixel array 702.

Figure 8:
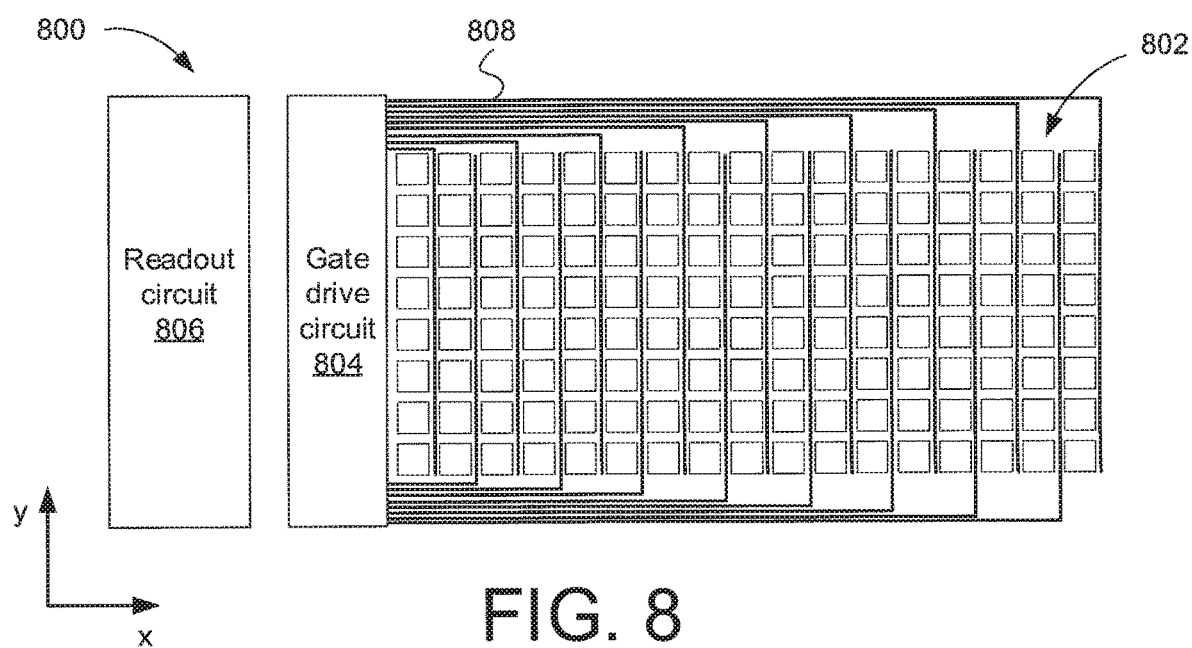

In another embodiment, as shown in the sensor device 800 in FIG. 8, the gate drive circuit 804 is disposed along the same axis (i.e., y-axis) and on the same side (i.e., left side) of the pixel array 802 as the readout circuit 806. Similar to FIG. 7, traces 808 in FIG. 8 from the gate drive circuit 804 to the individual pixels in the pixel array are routed along the outside of the pixel array.

Referring to FIGS. 7-8, the overall dimension of the sensor device is decreased in the y-axis direction relative to the approach in FIG. 6 because the gate drive circuit is moved to the left or right sides of the sensor array, i.e., along the same axis as the readout circuit.

Figure 9:
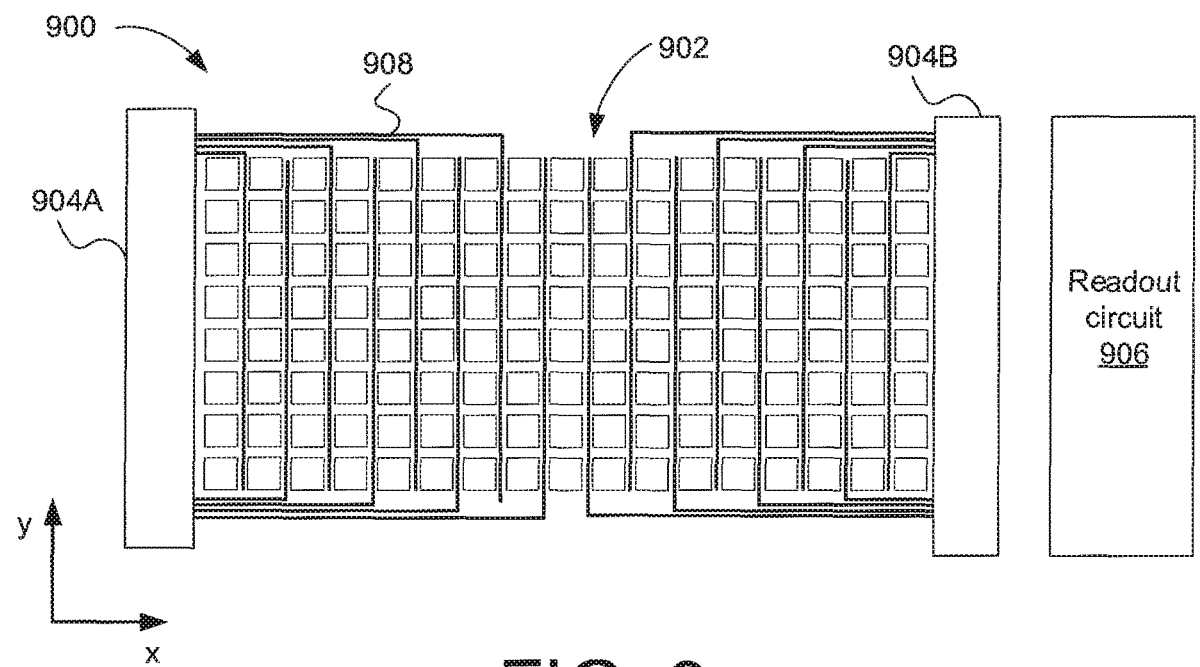

FIG. 9 is another example of a sensor device 900, according to one embodiment. In FIG. 9, the sensor device 900 includes a sensor array 902 and a readout circuit 906. The gate drive circuit, however, is divided in two portions 904A and 904B, with portion 904A on the left side of the pixel array 902 and portion 904B on the right side of the pixel array 902. Traces 908 are routed from the gate drive circuit portions 904A-904B to individual pixels. The traces 908 may be routed along the outside of the pixel array 902. The two portions 904A and 904B of the gate drive circuit and the readout circuit 906 are disposed along the same axis, i.e., the y-axis.

As an example, suppose there is 160 columns of pixels to drive in the sensor array. The gate drive circuit portion 904A may drive eighty columns and the gate drive circuit portion 904B may drive the other eighty columns. Of the eighty columns driven from the gate drive circuit portion 904A, forty columns can be driven by traces that run along the "top" of the sensor array and forty columns can be driven by traces that run along the "bottom" of the sensor array (i.e., "top" and "bottom" referring to the sensor array in the y-dimension). Similarly, of the eighty columns driven from the gate drive circuit portion 904B, forty columns can be driven by traces that run along the "top" of the sensor array and forty columns can be driven by traces that run along the "bottom" of the sensor array Since the gate drive circuit is divided into two portions, a fewer number of traces need to be routed along the outside of the sensor array 902 than compared to the designs shown in FIGS. 7-8. In this manner, the size of the sensor device in the y-dimension is further reduced.

Figure 10:
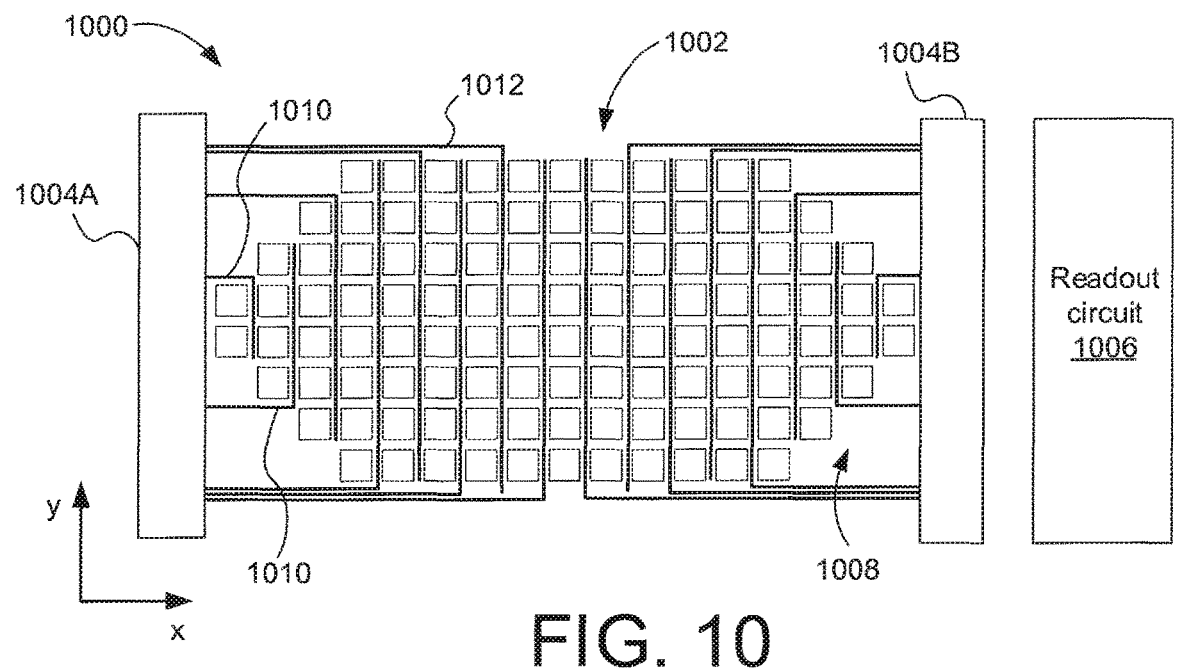

FIG. 10 is an example of another sensor device 1000, according to one embodiment. The sensor device 1000 is similar to the one shown in FIG. 9 and includes a pixel array 1002, a gate drive circuit divided in two portions 1004A, 1004B, and a readout circuit 1006. The two portions 1004A and 1004B of the gate drive circuit and the readout circuit 1006 are disposed along the same axis, i.e., the y-axis. However, certain pixels are not active or removed from the corners 1008 of the pixel array 1002. As such, the pixel array 1002 includes some columns that have a different number of pixels than other columns, and some rows that have a different number of pixels than other rows.

In one implementation, providing pixels that are not active or removed from the corners 1008 provides for additional room to route traces to the various pixels. The pixels in the corners 1008 may contribute less information to fingerprint recognition, so their deactivation or removal may not have a significant impact on fingerprint recognition results. As shown in FIG. 10, certain traces 1010 can be routed to their respective pixels without needing to be routed along the outside of the sensor array 1002, such as traces 1012. Since fewer traces are routed along the outside of the sensor array 1002, the size of the sensor device in the y-dimension is further reduced. In one implementation, removing pixels involves not including physical pixel circuitry at the removed locations. In another implementation, deactivating pixels involves maintaining the physical pixel circuitry at the removed locations, but not providing traces that activate the physical pixel circuitry.

Figure 11:
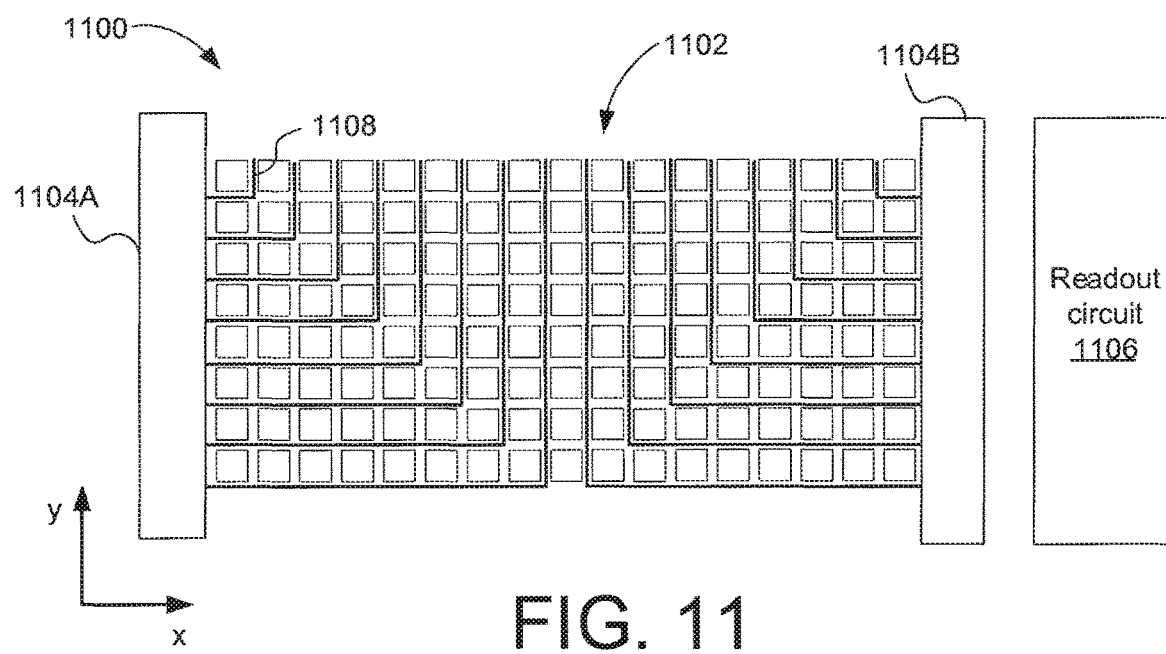

FIG. 11 is an example of another sensor device 1100, according to one embodiment. The sensor device 1100 is similar to the one shown in FIG. 9 and includes a pixel array 1102, a gate drive circuit divided in two portions 1104A-1104B, and a readout circuit 1106. The two portions 1104A and 1104B of the gate drive circuit and the readout circuit 1106 are disposed along the same axis, i.e., the y-axis. In FIG. 11, at least a portion of the traces 1108 are routed from the portions 1104A-1104B of the gate drive circuit in between the pixels of the pixel array 1102, and are not routed along the outside of the pixel array 1102. In some implementations, some routing may be routed along the outside of the pixel array 1102 (e.g., one or two traces), but the remaining traces are routed between the pixels. In one embodiment, in order to achieve intra-pixel routing, the pixel size is reduced to make room for the routing. Assuming the overall dimensions of the pixel array remain the same, reducing pixel size has the effect of increasing the spacing between individual pixels. In another embodiment, increasing the spacing between individual pixels provides more room to run routings between the pixels.

In another implementation, the pixels in the pixel array 1102 are the same size as the pixels in the pixel array 602, but the spacing between pixels is increased. In such an implementation, the overall size of the pixel array 1102 would be increased relative to the overall size of the pixel array 602.

In FIG. 11, since fewer traces are routed along the outside of the sensor array 1102, the size of the sensor device in the y-dimension can be further reduced in some implementations.

In further embodiments, the concepts described in the various embodiments can be combined. For example, some corner pixels can be deactivated or removed from the sensor array (as shown in FIG. 10) in combination with routing between pixels (as shown in FIG. 11).

It will be appreciated that although the examples discussed herein demonstrate the exemplary implementations of the disclosure with respect to fingerprint sensors, these techniques may also be used in other embodiments for other types of sensors having different resolutions beyond just sensors configured to detect fingerprint patterns.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A sensor device comprising:
a two-dimensional array of sensor pixel circuits, wherein the two-dimensional array includes a first axis and second axis, and wherein the two-dimensional array includes more sensor pixel circuits along the second axis than along the first axis;
a gate drive circuit disposed along on the first axis of the two-dimensional array configured to drive one or more sensor pixel circuits; and
a readout circuit disposed along on the first axis of the two-dimensional array configured to receive output information from the one or more sensor pixel circuits.

2. The sensor device of claim 1, wherein each of the sensor pixel circuits comprises a detector and a transistor connected to the detector, wherein the gate drive circuit is connected to a gate of the transistor of each of the sensor pixel circuits.

3. The sensor device of claim 2, wherein the readout circuit is connected to a source or a drain of the transistor of each of the sensor pixel circuits, and wherein the detector is connected to the other of the source or drain of the transistor of each of the sensor pixel circuits.

4. The sensor device of claim 1, wherein each of the sensor pixel circuits comprises a photodiode.

5. The sensor device of claim 1, wherein the sensor device comprises a fingerprint sensor.

6. The sensor device of claim 1, wherein the gate drive circuit is connected to the sensor pixel circuits with routing, wherein at least a portion of the routing runs along an outside of the two-dimensional array along the second axis.

7. The sensor device of claim 1, wherein the gate drive circuit is connected to the sensor pixel circuits with routing, wherein at least a portion of the routing runs in between individual sensor pixel circuits.

8. The sensor device of claim 1, wherein the two-dimensional array of sensor pixel circuits includes a plurality of rows of sensor pixel circuits and a plurality of columns of sensor pixel circuits, wherein a first row of sensor pixel circuits includes fewer sensor pixel circuits than a second row of sensor pixel circuits.

9. The sensor device of claim 1, wherein the two-dimensional array of sensor pixel circuits includes a plurality of rows of sensor pixel circuits and a plurality of columns of sensor pixel circuits, wherein a first column of sensor pixel circuits includes fewer sensor pixel circuits than a second column of sensor pixel circuits.

10. The sensor device of claim 1, wherein the two-dimensional array of sensor pixel circuits includes a plurality of rows of sensor pixel circuits and a plurality of columns of sensor pixel circuits, wherein one or more pixels are deactivated or removed from corners of the two-dimensional array of sensor pixel circuits.

11. The sensor device of claim 1, wherein the two-dimensional array, the gate drive circuit, and the readout circuit are formed on a thin-film transistor (TFT) layer, wherein the TFT layer is disposed on a glass or plastic substrate.

12. The sensor device of claim 1, wherein the two-dimensional array and the gate drive circuit are formed on a thin-film transistor (TFT) layer disposed on a first substrate, and wherein the readout circuit is disposed on a second substrate and is connected to the two-dimensional array with a flexible connector.

13. A sensor system, comprising:
an input surface providing a sensing region for sensing a fingerprint of a finger; and
a sensor device comprising:
a two-dimensional array of sensor pixel circuits for sensing the fingerprint, wherein the two-dimensional array includes a first axis and second axis, and wherein the two-dimensional array includes more sensor pixel circuits along the second axis than along the first axis;
a gate drive circuit disposed along on the first axis of the two-dimensional array configured to drive one or more sensor pixel circuits; and
a readout circuit disposed along on the first axis of the two-dimensional array configured to receive output information from the one or more sensor pixel circuits.

14. The sensor system of claim 13, wherein each of the sensor pixel circuits comprises a detector and a transistor connected to the detector, wherein the gate drive circuit is connected to a gate of the transistor of each of the sensor pixel circuits, and wherein the readout circuit is connected to a source or a drain of the transistor of each of the sensor pixel circuits, and wherein the detector is connected to the other of the source or drain of the transistor of each of the sensor pixel circuits.

15. The sensor system of claim 13, wherein each of the sensor pixel circuits comprises a photodiode.

16. The sensor system of claim 13, wherein the gate drive circuit is connected to the sensor pixel circuits with routing, wherein at least a portion of the routing runs along an outside of the two-dimensional array along the second axis.

17. The sensor system of claim 13, wherein the gate drive circuit is connected to the sensor pixel circuits with routing, wherein at least a portion of the routing runs in between individual sensor pixel circuits.

18. The sensor system of claim 13, wherein the two-dimensional array of sensor pixel circuits includes a plurality of rows of sensor pixel circuits and a plurality of columns of sensor pixel circuits, wherein a first row of sensor pixel circuits includes fewer sensor pixel circuits than a second row of sensor pixel circuits and wherein a first column of sensor pixel circuits includes fewer sensor pixel circuits than a second column of sensor pixel circuits so that one or more pixels are removed from corners of the two-dimensional array of sensor pixel circuits.

19. The sensor system of claim 13, wherein the two-dimensional array and the gate drive circuit are formed on a thin-film transistor (TFT) layer disposed on a first substrate.

20. A sensor device comprising:
a two-dimensional array of sensor pixel circuits, wherein the two-dimensional array includes a first axis and second axis, and wherein the two-dimensional array includes more sensor pixel circuits along the second axis than along the first axis;
means for driving one or more sensor pixel circuits, wherein the means for driving the one or more sensor pixel circuits is disposed along on the first axis of the two-dimensional array; and
means for receiving output information from the one or more sensor pixel circuits, wherein the means for receiving the output information from the one or more sensor pixel circuits is disposed along on the first axis of the two-dimensional array.

\* \* \* \* \*